(12) United States Patent
Gorczyca et al.

(10) Patent No.: US 6,787,071 B2
(45) Date of Patent: Sep. 7, 2004

(54) METHOD AND APPARATUS FOR PRODUCING DATA STORAGE MEDIA

(75) Inventors: Thomas Bert Gorczyca, Schenectady, NY (US); Laura Jean Meyer, Schenectady, NY (US); Matthew Frank Niemeyer, North Chatham, NY (US)

(73) Assignee: General Electric Company, Niskayuna, NY (US)

( * ) Notice: Subject to any disclaimer, the term of this patent is extended or adjusted under 35 U.S.C. 154(b) by 401 days.

(21) Appl. No.: 09/681,816

(22) Filed: Jun. 11, 2001

(65) Prior Publication Data

US 2002/0185759 A1 Dec. 12, 2002

(51) Int. Cl.[7] ........................... B29D 11/00; B29C 45/73
(52) U.S. Cl. ................. 264/1.33; 264/219; 264/328.16; 425/810
(58) Field of Search ................................ 264/1.1, 1.33, 264/106, 107, 219, 328.1, 328.16; 425/810; 249/111, 134, 114.1

(56) References Cited

U.S. PATENT DOCUMENTS

| | | |
|---|---|---|
| 4,225,109 A | 9/1980 | Yotsutsuji et al. |
| 4,879,082 A | 11/1989 | Kudo et al. |
| 5,041,247 A | 8/1991 | Kim |
| 5,124,192 A | 6/1992 | Kim et al. |
| 5,176,839 A | 1/1993 | Kim |
| 5,288,519 A | 2/1994 | Baumgartner et al. |
| 5,290,597 A | 3/1994 | Baumgartner et al. |
| 5,302,467 A | 4/1994 | Baumgartner et al. |
| 5,324,473 A | 6/1994 | Baresich |
| 5,388,803 A | 2/1995 | Baumgartner et al. |
| 5,458,818 A | 10/1995 | Kim et al. |
| 5,897,814 A | 4/1999 | Niemeyer et al. |
| 6,099,287 A * | 8/2000 | Higashida et al. .......... 425/190 |
| 6,146,558 A | 11/2000 | Feist et al. |

FOREIGN PATENT DOCUMENTS

EP  0 489 335 A1  6/1992

(List continued on next page.)

OTHER PUBLICATIONS

U. S. patent application "Method for Injection Molding of Optical Discs" by Matthew F. Niemeyer, et al., Ser. No. 08/874,235, filed Jun. 13, 1997.

Matthew F. Niemeyer and Thomas W. Hovatter, "Better Surface Replication for DVD and Recordable Discs Through Managed Heat Transfer", pp. 1–10 & 7 sheets of figures, presented at ITA–MOMS conference 10/96, San Francisco, CA.

DuPont Technical Bulletin "Pyralin Polymide Coatings for Electronics VM–651 and VM–652 Adhesion Promoters", H–73153, effective Jun. 1997, one page.

(List continued on next page.)

Primary Examiner—Mathieu D. Vargot
(74) Attorney, Agent, or Firm—Ann M. Agosti; Patrick K. Patnode

(57) ABSTRACT

In one embodiment, the method for producing a stamper, comprises: forming a nickel plated substrate having desired surface features on one side; disposing a managed heat transfer layer on a second side of said substrate; forming a thickness of said managed heat transfer layer having a variation of less than about 5%; and altering said exposed surface of said managed heat transfer layer. Also disclosed are a method and apparatus for producing data storage media.

42 Claims, 1 Drawing Sheet

FOREIGN PATENT DOCUMENTS

| | | |
|---|---|---|
| EP | 0 640 458 A1 | 3/1995 |
| EP | 0 796 713 A1 | 3/1996 |
| JP | 88-71325 | 9/1986 |
| JP | 87-5824 | 8/1987 |
| JP | 87-180541 | 8/1987 |
| JP | 630 71325 | 3/1988 |
| JP | 1-153263 * | 6/1989 |
| WO | WO 89/10829 | 11/1989 |

OTHER PUBLICATIONS

Matthew F. Niemeyer and Thomas W. Hovatter, "The Application of Managed Heat Transfer to the Production of Higher Quality Optical Discs", GE Plastics Article, pp. 1–9 & 7 Pages of Figures presented at Replitech Conference 6/96 California.

* cited by examiner

METHOD AND APPARATUS FOR PRODUCING DATA STORAGE MEDIA

BACKGROUND OF THE INVENTION

Various types of molds have long been in use for preparing optical discs from thermoplastic resins. Molds for these purposes are typically manufactured from metal or a similar material having high thermal conductivity. For most purposes, high thermal conductivity is desirable since it permits the resin in the mold to cool rapidly, shortening the molding cycle time. At times, however, cooling is so rapid that the resin freezes instantaneously at the mold surface upon introduction into the mold, forming a thin solid layer which, especially if is contains a filler, can create rough surfaces, voids, porosity and high levels or residual stress and orientation. In an optical disc, such imperfections impede the optical properties and decrease or eliminate the performance of the optical disc.

Therefore, in an injection molding of compact discs, for audio, video, or computer data storage and retrieval applications, heat transfer through the mold has a strong effect on molding time and disc attributes such as birefringence, flatness, and accuracy of feature replication.

One method for affecting heat transfer and improving the cycle time during injection molding is known as the technique of managed heat transfer (MHT). The basic principle of managed heat transfer is applying a passive thermal insulating layer to the mold to control the transient heat transfer between molten resin materials and the mold surfaces during the injection molding. The insulating layer comprises materials having both low thermal diffusivity and conductivity, thus slowing the cooling of the molded resin, and good resistance to high temperature degradation, permitting use in a mold maintained at high temperatures. For improving mechanical strength, abrasion resistance, oxidation resistance and thermal conductivity, at least one skin layer may be bonded to the insulating layer.

Another method for affecting heat transfer is forming a synthetic resin layer on a stamper by coating or lamination before the stamper is placed on a core molding surface of a metal mold.

The use of a heat transfer managing layer (HTM layer) such as the thermal insulating layer and the synthetic resin layer is desirable so as to cause a minimal change in the size and shape of a molding tool and equipment. However, requirements of optical clarity, surface morphology, and replication of surface features of submicron dimensions are very stringent for optical discs. Therefore, common insulating materials, which do not provide a smooth enough surface, are not stable for long periods at the mold temperature, or cannot withstand the repeated application of high pressure during the molding process, should be avoided.

It is also difficult to apply a thick polymer coating over a 6 inch-iameter surface without defects such as particles or bubbles getting into the film surface. Particles may be generated during the spin coating process as excess materials are spun off the stamper. Particles or bubbles in the coating forms "high" spots on the surface of the heat transfer managing layer, which causes dimples in the molded disc, potentially forming a defective track area.

Moreover, after applying the managing heat transfer layer to the stamper, the stampers are typically punched to a final dimension required for mounting onto an injection molding equipment. This punching or trimming process also shears the polymer coating, which, if brittle, can deposit particles in the surface of the layer. These may become statically attached to the polymer surface, and are not easily removed. The punch process may also leave a raised lip around the sheared perimeter, making mounting onto the molding machine more difficult.

SUMMARY OF THE INVENTION

It is therefore desirable to provide an apparatus, stamper, and method for manufacturing data storage media. In one embodiment, the method for manufacturing data storage media comprises: disposing a managed heat transfer layer in operable communication with a second surface of a stamper, wherein a first surface of said stamper comprises surface features, wherein an exposed surface of said managed heat transfer layer has been altered by a method selected from the group consisting of chemically, mechanically, or a combination thereof; disposing the stamper in a mold with at least a portion of said exposed surface disposed in operable communication with a mold half; injecting a molten plastic into said mold; cooling the plastic to form said data storage media; and releasing said data storage media from said mold.

In one embodiment, the molding apparatus for producing data storage media comprises: a stamper comprising a managed heat transfer layer, wherein a first surface of said stamper comprises surface features, and wherein an exposed surface of said managed heat transfer layer has been altered by a method selected from the group consisting of chemically, mechanically, or a combination thereof, and has a thickness variation of less than about 5%; and a support for receiving the stamper by operable communication with said managed heat transfer layer.

In one embodiment, the method for producing a stamper, comprises: forming a nickel plated substrate having desired surface features on one side; disposing a managed heat transfer layer on a second side of said substrate; forming a thickness of said managed heat transfer layer having a variation of less than about 5%; and altering an exposed surface of said managed heat transfer layer, wherein said altering is by a method selected from the group consisting of chemically altering, mechanically altering, or a combination thereof.

The above described and other features are exemplified by the following figure and detailed description.

BRIEF DESCRIPTION OF THE DRAWINGS

Referring now to the FIGURE, in which.

DETAILED DESCRIPTION

Figure 1:
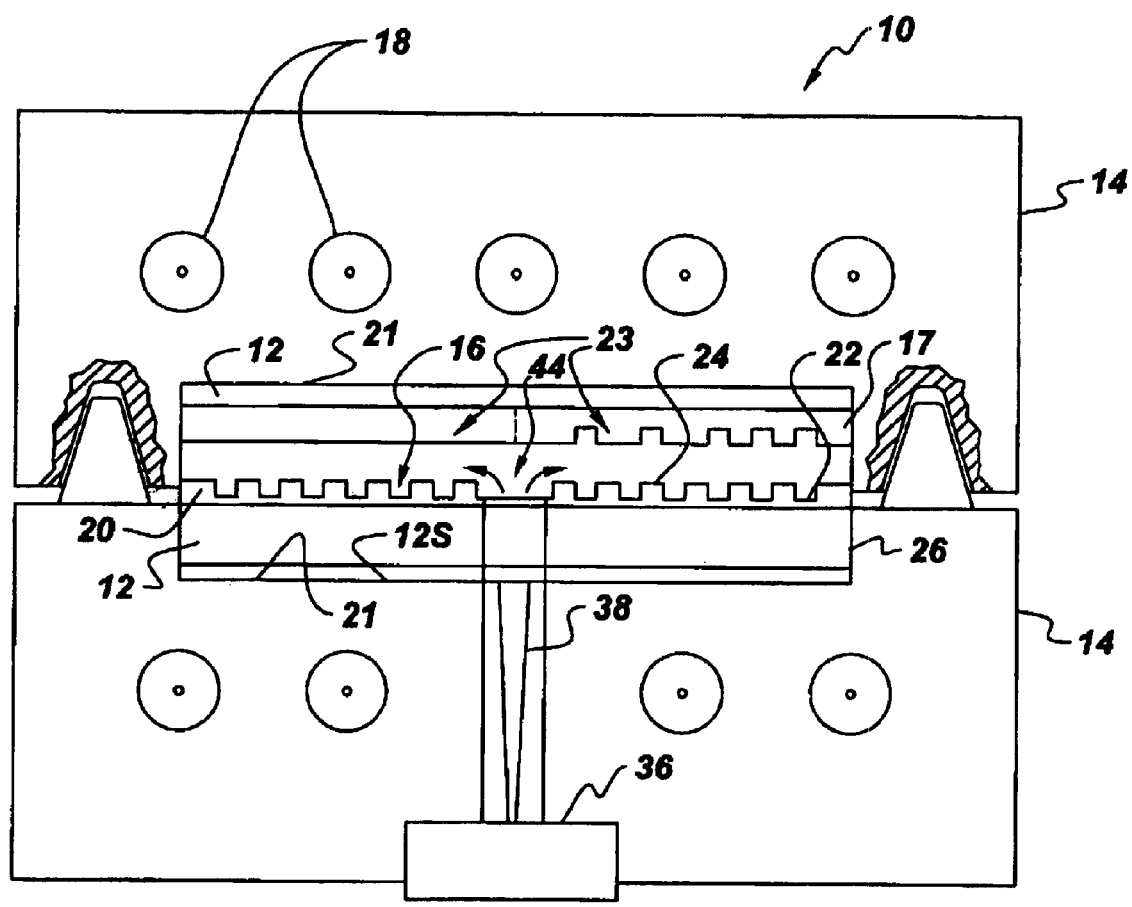
FIG. 1 is a sectional side view of one embodiment of an injection mold.

Managed heat transfer layer can be used in injection molding and injection-compression molding processes as layers disposed on the backside of the stamper in order to inhibit uncontrolled cooling of the molten material. Upon contacting the stamper, the molten material injected into the mold rapidly cools. If the rate of cooling is not managed, the resultant article can possess defects such as peeling, cracking, and areas of increased stress. The employment of a managed heat transfer layer on the back-side of the stamper (i.e., the side opposite the surface features and molten material contact) can control the rate of heat dissipation from the molten material, thereby improving the resultant article. Managed heat transfer layers are discussed in commonly assigned U.S. Pat. No. 6,146,588, which is incorporated herein by reference.

In order to further enhance the advantages attained by the employment of the managed heat transfer layer, various treatments can be employed. These treatments include: processing the managed heat transfer layer (e.g., via polishing, reactive ion etching (RIE), surface lapping, combinations comprising at least one of these treatments, and the like) to attain a substantially uniform thickness and flatness; extending the life of the managed heat transfer layer and/or the life of the stamper; chemically altering the surface of the managed heat transfer layer and/or applying a coating over the managed heat transfer layer, e.g., to inhibit adhesion to the adjacent mold half; and/or alter the coefficient of friction, at least in specified areas of the stamper to enhance vacuum adhesion to the mold in the clamping area. Good adhesion is desirable in the clamping area, but not in its molding area where the stamper presses against the mirror block. In this area, low friction is desirable to reduce the amount of abrasion the polymer receives with each stamping cycle.

Surface imperfections on the managed heat transfer layer can translate through the stamper to the article during the molding process creating random imperfections on the article surface and possibly forming a defective article (e.g., an unreadable optical disk). Similarly, nonuniformity of the managed heat transfer layer can cause uneven transfer of the stamper surface features to the article, similarly causing imperfections. Consequently, the managed heat transfer layer preferably has a substantially uniform thickness, i.e., a thickness that varies less than about 5% across the entire surface. More preferably, the thickness varies less than about 3%, with a thickness variation of less than about 1% even more preferred, and a variation of less than about 0.5% especially preferred. For example, the managed heat transfer layer preferably has a local (i.e., across a 1 centimeter square ($cm^2$) area) flatness (i.e., thickness variation), of less than about 75 nanometers (nm), with less than about 50 nm more preferred, and less than about 25 nm especially preferred.

Substantially uniform thickness can be attained by surface lapping using a grinding machine and very fine grit paper, i.e., grit paper having a grit particle size of less than or equal to about 9 micrometers. A particle size of less than or equal to about 5 micrometers is preferred, with a grit particle size of less than or equal to about 3 micrometers is preferred.

Surface lapping, or finishing, both remove slight amounts of material preferably starting from the "high" spots on the polymer coating. This is controlled by the hardness of the support material used to press the sandpaper down on the substrate. A "soft" material would conform to the existing surface, making it more difficult to remove microwaviness. A "hard" sandpaper backing would be better suited to remove surface defects (high spots) and surface microwaviness.

Similar to initially forming a substrate comprising a substantially uniform thickness, it is also preferred to retain the uniform thickness, free of surface defects, e.g., peeling, particles, or orange peel, during the use of the stamper. By removing surface defects such as peeling, which can adversely affect the electrical performance and aesthetics of the finished article (e.g., data storage media, and the like), the life of the managed heat transfer layer can be extended. For example, a typical managed heat transfer layer has a life of about 50,000 shots or less, by removing the peeling, the life can be extended to about 100,000 shots or more, with a life of about 200,000 shots or greater readily attainable.

Removal of the peeling can be attained by a polishing or surface lapping process that removes about 2 micrometers ($\mu$m) of material or less, with removal of about 1 $\mu$m or less preferred, and removal of about 0.5 $\mu$m or less especially preferred. Such limited removal of material can allow re-flattening of the managed heat transfer layer without reducing its effectiveness in managing the heat transfer.

In addition to extending the life of the managed heat transfer layer via removal of peeling, life extension can be attained by reducing adhesion of a used managed heat transfer layer to the adjacent mold half, and by improving friction and wear properties of the managed heat transfer layer. Essentially, after a period of employment of the managed heat transfer layer in molding equipment, the layer can adhere to the adjacent mold half, e.g., the mirror block on the molding equipment, resulting in damage to the heat transfer layer and mirror block upon removal of the stamper and managed heat transfer layer.

Reduction of adhesion to the molding equipment, as well as reduced friction and improved wear, can be attained by chemically altering the surface of the managed heat transfer layer that interfaces with the mold half. Chemically altering the surface can comprise changing, e.g., reducing, the surface polymer(s) chain length, and/or chemically reacting the surface polymer(s) with another material to change the chemical composition thereof. Chemical alteration can be accomplished via a chemical and/or plasma process. A chemical process can comprise exposing the surface to an aqueous caustic solution (e.g., an aqueous solution of an alkali or alkaline earth metal hydroxide, carbonate, or a combination comprising at least one of the foregoing solutions, such as potassium carbonate, barium hydroxide, potassium hydroxide, and the like) to reduce the polymer length, surface modulus, and hardness. For example, a polyimide managed heat transfer layer can be exposed to 2 wt % potassium hydroxide dissolved in and 80/20 mixture of ethanol and water to remove about 1 micrometer/minute ($\mu$m/min) of the polyimide coating. After etching, modulus for the polyimide surface is about 100 kilopounds per square inch (Kpsi) vs. 400 Kpsi for that of the bulk.

Alternatively, plasma or reactive ion etch can be employed to change the surface properties of the managed heat transfer layer. Parameters controlling reactive ion etching include the type and concentration of gas(es) present during the plasma process, the operating conditions that include temperature, pressure, power and frequency, and the chamber materials that can comprise metal, glass, and/or plastics such as tetrafluoroethylene fluorocarbon polymers (e.g., Teflon). Exposure of a managed heat transfer layer to the reactive ion etch chemistry can change its surface chemistry to provide more desirable properties. The reactive ion etching can be a dry etching, which breaks polymer chains and volatilizes them resulting in slow etching of the polymer, leaving a composite managed heat transfer layer having a surface with low weight average molecular weight (Mw) chains present and thus lower modulus than that found in the bulk of the layer, or it can fluorinate areas on the polymer chain, greatly reducing frictional wear on the surface during subsequent use in molding equipment.

Generally, a plasma reactive ion etching system employs a gas such as oxygen ($O_2$), chlorine ($Cl_2$), hydrochloric acid (HCl), fluorocarbons (e.g., Freon®, $CF_4$, $CHF_3$, and the like), nitrogen ($N_2$), nitrogen oxide ($N_2O$), argon (Ar), boron trichloride ($BCl_3$), hydrogen ($H_2$), sulfur hexafluoride ($SF_6$), and the like, as well as ions, reaction products, and combinations comprising at least one of the foregoing gases. For example, oxygen can be used in a reactive ion etch system to etch organic polymers. The plasma dissociates the oxygen into ions that readily oxidize organic material it contacts with into volatile compounds such as carbon dioxide, water, and nitric oxide. In another example, a polyimide managed heat transfer layer can be exposed to a fluorine ambient, such as trifluoromethane ($CHF_3$) plasma, which can be controlled to leave a fluorinated polymer layer on the polyimide to reduce surface adhesion and friction to the molding equipment.

Reactive ion etch systems generally consist of a vacuum chamber containing parallel plate electrodes, the cathode being powered by an rf generator at a frequency sufficient to form the plasma (e.g., for most gases, typically at a frequency of about 13.56 MHz), while the second electrode, or anode, is grounded. During etching, substrates are placed on the cathode, the chamber is evacuated and gases are introduced and regulated at low pressure, typically less than 1 Torr. By controlling the pressure, power and bias voltage on the cathode, RIE systems can etch a pattern either isotropically, that is, in all directions at and equal rate, or anisotropically, which means it predominately etches vertically, maintaining the original pattern width.

Alternative, or in addition, to chemically altering the surface of the managed heat transfer layer, friction and adhesion can be adjusted by employing a lubricant, either in the managed heat transfer layer and/or as a coating or film on the surface of the managed heat transfer layer, between the managed heat transfer layer and the molding equipment. Various layers that can be deposited with a substantially uniform thickness, will impart the desired lubricity, and is compatible with the molding conditions can be employed. Some possible lubricants include molybdenum disulfide ($MoS_2$), graphite fluoride $(CF_{1.1})_n$, silicone oils (such as polydimethylsiloxane and the like), fluorocarbon oils (such as perfluoropolyethers (Fomblin or Krytox) and the like), surfactants (such as FC430 commercially available from 3M, and the like), petroleum oils, and the like, as well as reaction products and combination comprising at least one of any of the foregoing lubricants.

If the lubricant is applied as a layer, the layer can be deposited by any technique capable of attaining the desired lubricity and thickness uniformity. Some possible techniques include spin coating, spraying, vapor deposition (e.g., chemical vapor deposition, plasma enhanced chemical vapor deposition, and the like), electrode position coating, meniscus coating, spray coating, extrusion coating, and the like, as well as combinations comprising at least one of these techniques. Typically, if a layer is employed, the layer preferably has a sufficient thickness to reduce the coefficient of friction between the layer and the molding equipment to about 0.5 or less. For example, the layer can have a thickness of about 1 micrometer or less, with a thickness of about 0.5 micrometers or less preferred, and a thickness of about 0.1 micrometers or less especially preferred. If the lubricant is combined into the managed heat transfer layer, less than or equal to about 60 weight percent (wt %) lubricant can be employed, with less than or equal to about 50 wt % preferred, and less than or equal to about 40 wt % lubricant especially preferred, based upon the total weight of the managed heat transfer layer. It is further preferred to employ greater than or equal to about 5 wt % lubricant, with greater than or equal to about 10 wt % lubricant preferred, based upon the total weight of the managed heat transfer layer.

Although random imperfections and non-uniform thickness in the managed heat transfer layer are not desirable, it can be advantageous to impart areas of increased friction on the surface of the managed heat transfer layer to enhance the ability of the molding equipment to retain the stamper in place. Preferably, the areas of increased thickness have a sufficiently small surface roughness (e.g., non-uniform thickness) to prevent translation of the roughness to the article, while enhancing stamper retention in the molding equipment. Generally, a roughness of less than or equal to about 0.50 μm is employed, with a roughness of less than or equal to about 0.40 μm preferred, and less than or equal to about 0.30 μm especially preferred, as measured from a plane of said managed heat transfer surface. It is also preferred to employ a roughness of greater than about 0.20 μm, with a roughness of greater than about 0.25 μm more preferred. Note, such roughness will still retain a substantially uniform thickness (e.g., a thickness variation of less than about 5%). It is especially preferred to increase the coefficient of friction to about 0.5 or so, with a coefficient of friction of about 1.0 or greater more preferred in the areas of contact with the mold, e.g., areas of vacuum contact.

Another issue that can increase the coefficient of friction and thus abrasion between the mirror block and the managed heat transfer layer is static charge buildup between the layers. A mirror block will often be coated with a hard, electrically insulating coating such as silicon nitride or diamond. Managed heat transfer layers can also be electrically non-conductive if made out of unfilled or undoped plastic coatings. Slight movement between the layers during mold operation can result in static charge build-up between them since the charge is not able to dissipate (or flow) through the insulator coatings to a neutral surface. This static charge increases the coefficient of friction, accelerating wear of both surfaces.

Coating of the managed heat transfer layer and/or mirror block with a static dissipating material such as an alkyl quaternary ammonium compound would allow the static charge to flow to a neutral site reducing the coefficient of friction. Alternatively, if the managed heat transfer coating was inherently electrically conductive, such as a low thermal conductive metal alloy, or a graphite filled or doped plastic material, coating with an electrically conductive material would not be as beneficial. Combining a lubricant with an electrically conductive compound for coating on non-electrically conductive managed heat transfer layer and mirror surfaces is preferred. For example, incorporating graphite fibers into the polymer used for forming the managed heat transfer layer would provide an electrically conductive coating. Application of $MoS_2$ on the surface of the graphite fiber filled polymer will provide a lubricated, electrically conductive managed heat transfer layer.

After prolonged use of the managed heat transfer layer in the molding equipment, it is possible that the surface modifications and lubricity at the surface has degraded enough such that the stamper no longer produces good quality disks. If this occurs, it is possible to repolish and/or surface treat the managed heat transfer layer again using the same techniques described above to render the stamper useful in subsequent data storage media (e.g., CD disks and the like) production.

Referring to the FIG. 1, a sectional side view of an injection mold 10 including a managed heat transfer layer 12 and a pair of mold halves 14 of high thermally conductive material forming a mold cavity 16 is illustrated. Thermally insulative is meant to include materials having coefficients of thermal conductivity less than that of the stamper employed in the molding press. Generally, a nickel stamper is used which has a thermal conductivity of about 92 watts per meter Kelvin (W/m·K). Any material having thermal conductivity lower than that of the nickel stamper, such as thermal conductivity of less than or equal to about 50 W/m·K would slow down the transfer of heat from the mold chamber to the mold press. Thermally conductive is meant to include materials having coefficients of thermal conductivity greater than or equal to about 100 W/m·K.

Cooling lines 18, such as copper pipes, are provided in each mold half 14 for receiving a cooling fluid to reduce cycle time. At least one compact disc or optical disc stamper 20 is positioned in the mold cavity 16 as shown and secured therein in a known manner. The stamper 20 has a grooved or pitted surface 22 carrying information. If desired, a second stamper 23, optionally comprising surface features on all, part, or none of its surface, can additionally be positioned in mold cavity 16. For purposes of example, a smooth surface of the stamper is represented by portion 19 and a grooved or pitted surface of the stamper for carrying information is represented by portion 17. Typically, the stamper comprises electroplated nickel, chrome, titanium, copper, silicon however, other materials, metals, and the like, as well as alloys composites, cermets, and combinations comprising at least one of the foregoing materials can be employed. Meanwhile, the mold halves typically comprise a ferrous material such as steel or the like, although other metals and/or alloys can similarly be employed.

Each mold half 14 can have a surface 21 disposed adjacent to the managed heat transfer layer 12 that optionally includes a surface-finished layer (e.g., lubricant layer, polished surface, lapped surface, and the like) 12S. The managed heat transfer layer 12 may be in the form of a single thin insulating layer or multilayer insulated structure that can be fabricated from low thermally conductive materials such as thermoplastic materials, thermoset materials, plastic composites, porous metals, ceramics, and low-conductivity metal alloys, and metal oxides, as well as cermets, composites, reaction products, and combinations comprising at least one of the foregoing materials. Possible metal materials include Nichrome (60% Ni and 20% Cr), Invar (64% Fe, 36% Ni), titanium, and the like. Possible ceramics include aluminum oxide, silicon oxide, aluminum nitride, and silicon carbide, and the like. Possible plastics include amorphous, crystalline, and/or semicrystalline materials and reaction products and combinations comprising at least one of the foregoing materials. Typical plastics used for forming the managed heat transfer layer comprise polyimides, polyamideimides, polyamides, polysulfone, polyethersulfone, polytetrafluoroethylene, and polyetherketone, as well as composites, reaction products, and combinations comprising at least one of the foregoing materials and/or a plastic set forth below. The plastic is typically applied in uncured form (e.g., as a polyamic acid in the case of a polyimide or polyamideimide) and subsequently heat cured. Preferably, the managed heat transfer layer is flexible film such as a polyimide film manufactured under the trademark KAPTON.

Generally, the managed heat transfer layer has a thickness that is greater than about 0.1 mil (0.00254 millimeters (mm)), with greater than about 0.5 mils (0.0127 mm) preferred. It is further preferred to have a thickness of less than about 5 mils (0.127 mm), with less than about 2 mils (0.0508 mm) more preferred.

In addition to the above materials, the managed heat transfer layer can comprise fillers. The fillers should have a size and geometry that does not interfere with the primary and secondary surface features. Some possible filler include glass, aluminum silicate ($AlSiO_3$), barium sulfate ($BaSO_4$), alumina ($Al_2O_3$), silica, and the like, or a layer of filled polyimide resin coated with a layer of non-filled polyimide resin, as well as combinations and layers, comprising at least one of the foregoing fillers.

During molding, molten plastic resin 44 can be injected into the mold cavity 16 via a sprue bushing 36 and a sprue 38. Possible plastics include amorphous, crystalline, and/or semicrystalline materials and reaction products and combinations comprising at least one of the foregoing materials. For example the plastic can comprise: polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate, methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene fluorocarbon polymers (e.g., Teflons). The plastic may also or alternatively comprise thermosetting resins such as epoxy, phenolic, alkyds, polyester, polyimide, polyurethane, mineral filled silicone, bis-maleimides, cyanate esters, vinyl, and benzocyclobutene resins. Additionally, the plastic may comprise blends, copolymers, mixtures, reaction products and composites comprising at least one of the foregoing thermoplastics and/or thermosets. For example, "Nylon 6" or "Nylon 12" or "Nylon 6,6" which are commercially available, can be employed.

Various thermoplastic materials may be used such as polyamide, for example, "Nylon 6" or "Nylon 12" or "Nylon 6,6" which are commercially available"; and other polymers such as polyesters, poly(butylene terephthalate) (PBT), poly (ethylene terephthalate) (PET), and PBT with soft ether linkages formed of polycarbonate and methylene, polyether ketones, polyetherimides, polylactams, polypropylenes, polyethylenes, polystyrene (PS), styrene acrylonitrile, acrylonitrile butadiene terpolymers, polyphenylene oxide/polystyrene and polyphenylene oxide/nylon and high impact styrenes filled or unfilled and blends thereof.

Heat from the plastic 44 is absorbed through the stamper 20. The managed heat transfer layer preferably prevents quick cooling of the plastic 44, regulating heat transfer. This results in a hot plastic surface at the interface between the stamper 20 and the plastic 44 for a short time period. The managed heat transfer layer 12 and the stamper 20 cooperate to provide the desired surface quality to the produced article (e.g., data storage media).

EXAMPLE 1

Ni stamper (commercially available from Technicolor, Ruckersville, Va.), for manufacture of CD-ROM, was cleaned using propanol solvent and clean-room Texwipe cloth. Approximately 10 grams polyimide solution (Dupont, PI2611)was dispensed on the center of the stamper and it was spun at 800 revolutions per minute (rpm) for 30 seconds to obtain a uniform coating on the stamper backside surface.

The coating was baked in an oven with ramped temperature from 100° C. to 400° C. over 4 hours and held at 400° C. for 1 hour to obtain a final cured film thickness of approximately 24 μm. After curing, the front side having information of the stamper was protected by application of Nitto tape, then the other side was subjected to a surface treatment by using Model P-127 High Quality Micro Sander lapping machine (commercially available from Record Products of America, Hamden, Conn.) with a fine paper (9 micrometer Imperial Lapping Paper commonly available from 3M®). Preliminary surface roughness (Ra) for the cured polyimide was 107 nanometers (nm), after polishing it was reduced to 48 nanometers.

EXAMPLE 2

A Ni stamper having a polyimide layer was prepared as in Example 1. With the front side having information of the stamper protected, the other side was subjected to a surface treatment by using an etching of 2 wt % potassium hydroxide dissolved in and 80/20 mixture of ethanol and water which will remove about 1 micrometer/minute of the polyimide coating. After etching for 1 minute, the modulus for the polyimide surface was about 100 Kpsi vs. 400 Kpsi for that of the bulk.

EXAMPLE 3

A Ni stamper having a polyimide layer was prepared as in Example 1. With the front side having information of the stamper protected, the other side was subjected to plasma treatment by using a reactive ion etching system (Anelva, Model 506 Parallel Plate System) in which $CHF_3$ gas at a flow rate of 200 standard cubic centimeters (sccm) at a pressure of 500 milliTorr using an rf frequency of 13.56 megahertz (MHz) and 300 watts (W) power. Using these conditions, a fluorinated carbon layer was deposited on the polyimide layer at a deposition rate of approximately 500 angstroms/minute.

EXAMPLE 4

On a Ni stamper substrate, approximately 10 grams polyimide solution (Dupont, PI2611) was dispensed in the center. The stamper was spun at 800 rpm for 30 seconds to obtain a uniform coating on the stamper backside surface. The coating was baked in an oven with ramped temperature from 100° C. to 400° C. for over 4 hours and held at 400° C. for 1 hour to obtain a final cured film thickness of approximately 24 μm. After cure, the front information side was protected with Nitto tape and the backside managed heat transfer polymer layer was hand polished to remove film defects due to particles and bubbles. A 3M® hard rubber sanding block was used with 12,000 grit Micro Mesh cushioned abrasive sand paper commercially available from Micro-Surface Finishing Products, Inc., Wilton, Iowa. Preliminary surface roughness for the cured polyimide was 107 nanometers, after polishing it was reduced to 24 nanometers.

In the above examples, particles and small bubbles that can exist in the non-treated managed heat transfer layers were removed. Also, dimples and flaws were removed to result in a local flatness of less than about 50 nm. Further, when installing the stampers prepared in the examples to a mold, injecting plastic (e.g., polycarbonate and the like) to the mold to form an article (e.g., optical discs, and various other articles requiring a smooth surface), imperfections on the surface of the storage media was reduced. Imperfections on the optical disk commonly consist of dimples (caused by bubbles or particles on the managed heat transfer layer) or microwaviness (caused by non-uniform coating of the managed heat transfer layer) both of which can interfere with play back of information on the disk. Surface treatments of the managed heat transfer layer removes these imperfections and allows much longer lifetime in the mold apparatus due to reduced abrasion during the molding process.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for manufacturing an article, comprising:
   disposing a managed heat transfer layer in operable communication with a second surface of a stamper, wherein a first surface of said stamper comprises surface features, wherein an exposed surface of said managed heat transfer layer has been altered by a method selected from the group consisting of chemically, or a combination of chemically and mechanically;
   disposing the stamper in a mold with at least a portion of said exposed surface disposed in operable communication with a mold half;
   injecting a molten plastic into said mold;
   cooling the plastic to form said article; and
   releasing said article from said mold.

2. The method of claim 1, further comprising forming a thickness of said managed heat transfer layer having a variation of less than about 5%.

3. The method of claim 2, wherein forming said thickness further comprises surface lapping said exposed surface.

4. The method of claim 2, wherein said thickness varies less than about 3%.

5. The method of claim 4, wherein said thickness varies less than about 1%.

6. The method of claim 5, wherein said thickness varies less than about 0.5%.

7. The method of claim 3, wherein said lapping further comprises grinding with sand paper having a grit particle size of less than or equal to about 9 micrometers.

8. The method of claim 1, wherein said chemically altered exposed surface comprises a polymer chain length shorter than a non-chemically altered portion of said managed heat transfer layer.

9. The method of claim 1, wherein said managed heat transfer layer comprises a material selected from the group consisting of thermoset materials, plastics, porous metals, ceramics, low-conductivity metal alloys, and cermets, composites, reaction products, and combinations comprising at least one of the foregoing materials.

10. The method of claim 9, wherein said material is selected from the group consisting of polyimides, polyamideimides, polyamides, polysulfone, polyethersulfone, polytetrafluoroethylene, polyetherketone, and composites, reaction products, and combinations comprising at least one of the foregoing materials.

11. The method of claim 1, wherein said managed heat transfer layer further comprises a lubricant component either incorporated into the managed heat transfer layer or placed on its surface.

12. The method of claim 11, wherein lubricant is selected from the group consisting of molybdenum disulfide ($MoS_2$) graphite fluoride $(CF_{1.1})_n$, and reaction products and combinations comprising at least one of the foregoing lubricants.

13. The method of claim 11, wherein said managed heat transfer layer comprises about 5 wt % to about 60 wt % of said lubricant, based upon the total weight of the managed heat transfer layer.

14. The method of claim 13, wherein said managed heat transfer layer comprises about 5 wt % to about 50 wt % of said lubricant, based upon the total weight of the managed heat transfer layer.

15. The method of claim 14, wherein said managed heat transfer layer comprises about 10 wt % to about 40 wt % of said lubricant, based upon the total weight of the managed heat transfer layer.

16. The method of claim 11, wherein said lubricant is in the form of a layer disposed on said exposed surface.

17. The method of claim 16, wherein said lubricant layer has a thickness of less than or equal to about 1 micrometer.

18. The method of claim 17, wherein said thickness is about 0.01 micrometers to about 0.10 micrometers.

19. The method of claim 1, wherein said exposed surface further comprises an area of roughness where said exposed surface operably communicates with said mold, wherein said roughness is less than or equal to about 0.50 micrometers, as measured from a plane of said managed heat transfer surface.

20. The method of claim 19, wherein said roughness is about 0.20 micrometers to about 0.40 micrometers.

21. The method of claim 20, wherein said roughness is about 0.25 micrometers to about 0.30 micrometers.

22. The method of claim 1, wherein a coefficient of friction of greater than or equal to about 0.50 exists in an area of physical contact between said managed heat transfer layer and said second surface.

23. The method of claim 1, wherein said article is a data storage media.

24. A method for manufacturing an article, comprising:
disposing a managed heat transfer layer in operable communication with a second surface of a stamper, wherein a first surface of said stamper comprises surface features, wherein an exposed surface of said managed heat transfer layer has been mechanically altered;
disposing the stamper in a mold with at least a portion of said exposed surface disposed in operable communication with a mold half;
injecting a molten plastic into said mold;
cooling the plastic to form said article; and
releasing said article from said mold.

25. The method of claim 24, further comprising forming a thickness of said managed heat transfer layer having a variation of loss than about 5%.

26. The method of claim 25, wherein forming said thickness further comprises surface lapping said exposed surface.

27. The method of claim 26, wherein said lapping further comprises grinding with sand paper having a grit particle size of less than or equal to about 9 micrometers.

28. The method of claim 25, wherein said thickness varies less than about 3%.

29. The method of claim 27, wherein said thickness varies less than about 1%.

30. The method of claim 28, wherein said thickness varies less than about 0.5%.

31. The method of claim 24, wherein said managed heat transfer layer comprises a material selected from the group consisting of thermoset materials, plastics, porous metals, ceramics, low-conductivity metal alloys, and cermets, composites, reaction products, and combinations comprising at least one of the foregoing materials.

32. The method of claim 31, wherein said material is selected from the group consisting of polyimides, polyamideimides, polyamides, polysulfone, polyethersulfone, polytetrafluoroethylene, polyetherketone, and composites, reaction products, and combinations comprising at least one of the foregoing materials.

33. The method of claim 24, wherein said managed heat transfer layer further comprises a lubricant component either incorporated into the managed heat transfer layer or placed on its surface.

34. The method of claim 33, wherein lubricant is selected from the group consisting of molybdenum disulfide ($MoS_2$), graphite fluoride $(CF_{1.1})_n$, and reaction products and combinations comprising at least one of the foregoing lubricants.

35. The method of claim 33, wherein said managed heat transfer layer comprises about 5 wt % to about 60 wt % lubricant, based upon the total weight of the managed heat transfer layer.

36. The method of claim 35, wherein said managed heat transfer layer comprises about 5 wt % to about 50 wt % lubricant, based upon the total weight of the managed heat transfer layer.

37. The method of claim 36, wherein said managed heat transfer layer comprises about 10 wt % to about 40 wt % lubricant, based upon the total weight of the managed heat transfer layer.

38. The method of claim 33, wherein said lubricant is in the form of a layer disposed on said exposed surface.

39. The method of claim 38, wherein said lubricant layer has a thickness of less than or equal to about 1 micrometer.

40. The method of claim 39, wherein said thickness is about 0.01 micrometers to about 0.10 micrometers.

41. The method of claim 24, wherein said exposed surface further comprises an area of roughness where said exposed surface operably communicates with said mold, wherein said roughness is less than or equal to about 0.50 micrometers, as measured from a plane of said managed heat transfer surface.

42. The method of claim 41, wherein said roughness is about 0.20 micrometers to about 0.40 micrometers.

* * * * *